(12) United States Patent
Mesdaq et al.

(10) Patent No.: US 9,294,501 B2
(45) Date of Patent: Mar. 22, 2016

(54) FUZZY HASH OF BEHAVIORAL RESULTS

(71) Applicant: FireEye, Inc., Milpitas, CA (US)

(72) Inventors: Ali Mesdaq, San Jose, CA (US); Paul L. Westin, III, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 145 days.

(21) Appl. No.: 14/042,454

(22) Filed: Sep. 30, 2013

(65) Prior Publication Data

US 2015/0096023 A1    Apr. 2, 2015

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/56 | (2013.01) |

(52) U.S. Cl.
CPC ............ *H04L 63/145* (2013.01); *G06F 21/566* (2013.01); *H04L 63/1416* (2013.01); *G06F 21/56* (2013.01); *G06F 21/562* (2013.01); *G06F 21/564* (2013.01); *H04L 63/14* (2013.01); *H04L 63/1408* (2013.01)

(58) Field of Classification Search
CPC ..... G06F 21/56; G06F 21/562; G06F 21/564; H04L 63/14; H04L 63/1408; H04L 63/1416
USPC ................................... 726/23–24
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | | |
|---|---|---|---|
| CN | 102811213 A | * | 12/2012 |
| GB | 2439806 | | 1/2008 |

(Continued)

OTHER PUBLICATIONS

Using Fuzzy Pattern Recognition to Detect Unknown Malicious Executables Code; Boyun Zhang, L. Wang and Y. Jin (Eds.): FSKD 2005, LNAI 3613, pp. 629-634, 2005. Springer-Verlag Berlin Heidelberg 2005.*

(Continued)

*Primary Examiner* — Jayesh Jhaveri
(74) *Attorney, Agent, or Firm* — Rutan & Tucker, LLP; William W. Schaal

(57) ABSTRACT

A computerized method is described in which a received object is analyzed by a malicious content detection (MCD) system to determine whether the object is malware or non-malware. The analysis may include the generation of a fuzzy hash based on a collection of behaviors for the received object. The fuzzy hash may be used by the MCD system to determine the similarity of the received object with one or more objects in previously classified/analyzed clusters. Upon detection of a "similar" object, the suspect object may be associated with the cluster and classified based on information attached to the cluster. This similarity matching provides 1) greater flexibility in analyzing potential malware objects, which may share multiple characteristics and behaviors but are also slightly different from previously classified objects and 2) a more efficient technique for classifying/assigning attributes to objects.

26 Claims, 9 Drawing Sheets

(56) References Cited

U.S. PATENT DOCUMENTS

| | | |
|---|---|---|
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack |
| 6,357,008 B1 | 3/2002 | Nachenberg |
| 6,417,774 B1 | 7/2002 | Hibbs et al. |
| 6,424,627 B1 | 7/2002 | Srhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,694,150 B1 * | 4/2010 | Kirby ................ G06F 21/55 713/188 |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |

(56) References Cited

U.S. PATENT DOCUMENTS

| | | |
|---|---|---|
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman, III et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0229254 A1* | 10/2005 | Singh ............... G06F 21/55 726/23 |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |

(56) References Cited

U.S. PATENT DOCUMENTS

| | | |
|---|---|---|
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1* | 3/2008 | Tan et al. ................ 713/168 |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047597 A1* | 2/2011 | Mahaffey et al. ................ 726/3 |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093426 A1* | 4/2011 | Hoglund ................ 706/52 |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0174227 A1* | 7/2012 | Mashevsky ........... G06F 21/562 |

(56) References Cited

U.S. PATENT DOCUMENTS

| | | | |
|---|---|---|---|
| 2012/0198279 | A1 | 8/2012 | Schroeder |
| 2012/0210423 | A1 | 8/2012 | Friedrichs et al. |
| 2012/0222121 | A1 | 8/2012 | Staniford et al. |
| 2012/0255015 | A1 | 10/2012 | Sahita et al. |
| 2012/0255017 | A1 | 10/2012 | Sallam |
| 2012/0260304 | A1* | 10/2012 | Morris .............. G06F 21/56 726/1 |
| 2012/0260342 | A1 | 10/2012 | Dube et al. |
| 2012/0266244 | A1 | 10/2012 | Green et al. |
| 2012/0278886 | A1 | 11/2012 | Luna |
| 2012/0297489 | A1 | 11/2012 | Dequevy |
| 2012/0330801 | A1 | 12/2012 | McDougal et al. |
| 2013/0014259 | A1 | 1/2013 | Gribble et al. |
| 2013/0036472 | A1 | 2/2013 | Aziz |
| 2013/0047257 | A1 | 2/2013 | Aziz |
| 2013/0074185 | A1 | 3/2013 | McDougal et al. |
| 2013/0086684 | A1 | 4/2013 | Mohler |
| 2013/0097699 | A1* | 4/2013 | Balupari .............. G06F 21/552 726/22 |
| 2013/0097706 | A1 | 4/2013 | Titonis et al. |
| 2013/0111587 | A1 | 5/2013 | Goel et al. |
| 2013/0111591 | A1* | 5/2013 | Topan .............. G06F 21/563 726/24 |
| 2013/0117852 | A1 | 5/2013 | Stute |
| 2013/0117855 | A1 | 5/2013 | Kim et al. |
| 2013/0139264 | A1 | 5/2013 | Brinkley et al. |
| 2013/0160125 | A1 | 6/2013 | Likhachev et al. |
| 2013/0160127 | A1 | 6/2013 | Jeong et al. |
| 2013/0160130 | A1 | 6/2013 | Mendelev et al. |
| 2013/0160131 | A1 | 6/2013 | Madou et al. |
| 2013/0167236 | A1 | 6/2013 | Sick |
| 2013/0174214 | A1 | 7/2013 | Duncan |
| 2013/0185789 | A1 | 7/2013 | Hagiwara et al. |
| 2013/0185795 | A1 | 7/2013 | Winn et al. |
| 2013/0185798 | A1 | 7/2013 | Saunders et al. |
| 2013/0191915 | A1 | 7/2013 | Antonakakis et al. |
| 2013/0196649 | A1 | 8/2013 | Paddon et al. |
| 2013/0227691 | A1 | 8/2013 | Aziz et al. |
| 2013/0246370 | A1 | 9/2013 | Bartram et al. |
| 2013/0263260 | A1 | 10/2013 | Mahaffey et al. |
| 2013/0291109 | A1 | 10/2013 | Staniford et al. |
| 2013/0298243 | A1 | 11/2013 | Kumar et al. |
| 2014/0053260 | A1 | 2/2014 | Gupta et al. |
| 2014/0053261 | A1 | 2/2014 | Gupta et al. |
| 2014/0130158 | A1 | 5/2014 | Wang et al. |
| 2014/0137180 | A1 | 5/2014 | Lukacs et al. |
| 2014/0165203 | A1* | 6/2014 | Friedrichs .............. G06F 21/56 726/24 |
| 2014/0169762 | A1 | 6/2014 | Ryu |
| 2014/0179360 | A1 | 6/2014 | Jackson et al. |
| 2014/0328204 | A1 | 11/2014 | Klotsche et al. |
| 2014/0337836 | A1 | 11/2014 | Ismael |
| 2014/0351935 | A1 | 11/2014 | Shao et al. |
| 2015/0047034 | A1* | 2/2015 | Burnham .............. H04L 63/1425 726/23 |
| 2015/0096025 | A1 | 4/2015 | Ismael |
| 2015/0135262 | A1* | 5/2015 | Porat .............. H04L 63/145 726/1 |

FOREIGN PATENT DOCUMENTS

| | | |
|---|---|---|
| GB | 2490431 A | 10/2012 |
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012/145066 | 10/2012 |
| WO | 2013/067505 A1 | 5/2013 |

OTHER PUBLICATIONS

"Measuring Similarity of Malware Behavior", Martin Apel, Christian Bockermann and Michael Meier, (University of Dortmund), The 5th LCN Workshop on Security in Communications Networks (SICK 2009) Zürich, Switzerland; Oct. 20-23, 2009.*

IEEE Xplore Digital Library Sear Results for "detection of unknown computer worms". Http//ieeexplore.ieee.org/searchresult.jsp?SortField=Score&SortOrder=desc&ResultC. . . , (Accessed on Aug. 28, 2009).

AltaVista Advanced Search Results. "Event Orchestrator". Http://www.altavista.com/web/results?ltag=ody&pg=aq& aqmode=aqa=Event+Orchesrator. . . , (Accessed on Sep. 3, 2009).

AltaVista Advanced Search Results. "attack vector identifier". Http://www.altavista.com/web/results?ltag=ody&pg=aq& aqmode=aqa=Event+Orchestrator. . . , (Accessed on Sep. 15, 2009).

Cisco, Configuring the Catalyst Switched Port Analyzer (SPAN) ("Cisco"), (1992-2003).

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Excerpt regarding First Printing Date for Merike Kaeo, Designing Network Security ("Kaeo"), (2005).

The Sniffers's Guide to Raw Traffic available at: yuba.stanford.edu/~casado/pcap/section1.html, (Jan. 6, 2014).

NetBIOS Working Group. Protocol Standard for a NetBIOS Service on a TCP/UDP transport: Concepts and Methods. STD 19, RFC 1001 Mar. 1987.

"Network Security: NetDetector—Network Intrusion Forensic System (NIFS) Whitepaper", ("*NetDetector Whitepaper*"), (2003).

"Packet", *Microsoft Computer Dictionary, Microsoft Press*, (Mar. 2002), 1 page.

"When Virtual is Better Than Real", *IEEEXplore Digital Library*, available at, http://ieeexplore.ieee.org/xpl/articleDetails.jsp?reload=true&arnumber=990073, (Dec. 7, 2013).

Abdullah, et al., *Visualizing Network Data for Intrusion Detection*, 2005 IEEE Workshop on Information Assurance and Security, pp. 100-108.

Adetoye, Adedayo , et al., "Network Intrusion Detection & Response System", ("*Adetove*"), (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", *Springer-verlag Berlin Heidelberg*, (2006), pp. 165-184.

Bayer, et al., "Dynamic Analysis of Malicious Code", *J Comput Virol*, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("*Boubalos*"), (Jun. 5, 2003).

Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Cohen, M.I. , "PyFlag—An advanced network forensic Framework", *Digital Investigation 5*, Elsevier, (2008), pp. S112-S120.

Costa, M. , et al., "Vigilante: End-to-End Containment of Internet Worms", *SOSP '05, Association for Computing Machinery, Inc., Brighton U.K.*, (Oct. 23-26, 2005).

Crandall, J.R. , et al., "Minos:Control Data Attack Prevention Orthogonal to Memory Model", *37th International Symposium on Microarchitecture*, Portland, Oregon, (Dec. 2004).

Deutsch, P. , "Zlib compressed data format specification version 3.3" RFC 1950, (1996).

Distler, "Malware Analysis: An Introduction", *SANS Institute InfoSec Reading Room*, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).

(56) References Cited

OTHER PUBLICATIONS

Filiol, Eric, et al., "Combinatorial Optimisation of Worm Propagation on an Unknown Network", International Journal of Computer Science 2.2 (2007).
Goel, et al., *Reconstructing System State for Intrusion Analysis*, Apr. 2008 SIGOPS Operating Systems Revies, vol. 42 Issue 3, pp. 21-28.
Hjelmvik, Erik, "Passive Network Security Analysis with Network Miner", *(IN)Secure*, Issue 18, (Oct. 2008), pp. 1-100.
Kaeo, Merike, "Designing Network Security", ("*Kaeo*"), (Nov. 2003).
Kim, H., et al., "Autograph: Toward Automated, Distributed Worm Signature Detection", *Proceedings of the 13th Usenix Security Symposium (Security 2004)*, San Diego, (Aug. 2004), pp. 271-286.
Krasnyansky, Max, et al., *Universal TUN/TAP driver*, available at https://www.kernel.org/doc/Documentation/networking/tuntap.txt(2002) ("*Krasnyansky*").
Kreibich, C., et al., "Honeycomb-Creating Intrusion Detection Signatures Using Honeypots", *2nd Workshop on Hot Topics in Networks (HotNets-II)*, Boston, USA, (2003).
Warning System Design and Testing, *Institute for Security Technology studies, Dartmouth College*, ("Liljenstam"), (Oct. 27, 2003).
Marchette, David J., "Computer Intrusion Detection and Network Monitoring: A Statistical Viewpoint", ("*Marchette*"), (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", *Infocom*, vol. 3, (Mar. 30-Apr. 3, 2003), pp. 1901-1910.
Morales, Jose A., et al., ""Analyzing and exploiting network behaviors of malware."", *Security and Privacy in Communication Networks*. Springer Berlin Heidelberg, 2010. 20-34.
Natvig, Kurt, "SANDBOXII: Internet", *Virus Bulletin Conference*, ("Natvig"), (Sep. 2002).
Newsome, J., et al., "Dynamic Taint Analysis for Automatic Detection, Analysis and Signature Generation of Exploits on Commodity Software", *In Proceedings of the 12th Annual Network and Distributed System Securty, Symposium* (NDSS '05), (Feb. 2005).
Newsome, J., et al., "Polygraph: Automatically Generating Signatures for Polymorphic Worms", *In Proceedings of the IEEE Symposium on Security and Privacy*, (May 2005).
Nojiri, D., et al., "Cooperation Response Strategies for Large Scale Attack Mitigation", *DARPA Information Survivability Conference and Exposition*, vol. 1, (Apr. 22-24, 2003), pp. 293-302.
Silicon Defense, "Worm Containment in the Internal Network", (Mar. 2003), pp. 1-25.
Singh, S., et al., "Automated Worm Fingerprinting", *Proceedings of the ACM/USENIX Symposium on Operating System Design and Implementation*, San Francisco, California, (Dec. 2004).
Spitzner, Lance, "Honeypots: Tracking Hackers", ("*Spizner*"), (Sep. 17, 2002).
Thomas H. Ptacek, and Timothy N. Newsham Denial, "Insertion, Evasion, and Denial of Service: Eluding Network Intrusion Detection", *Secure Networks*, ("Ptacek"), (Jan. 1998).
Venezia, Paul, "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference, Las Vegas, NV, USA*, (Dec. 2002), pp. 1-9.
"White Paper Advanced Threat Protection 1-16 Solution", URL:http://cdn2.hubspot.net/hub/237610/file-232929750-pdf/White_Papers/WP-_Seculert_Solution.pdf, dated Jul. 28, 2013.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek-.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Jiyong Jang et al. "BitShred" Computer and Communications Security, ACM, dated (p. 309-320) Oct. 17, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Mori, Detecting Unknown Computer Viruses, 2004, Springer-Verlag Berlin Heidelberg.
Oberheide et al., CloudAV.sub.-N-Version Antivirus in the Network Cloud, 17th USENIX Security Symposium USENIX Security '08 Jul. 28-Aug. 1, 2008 San Jose, CA.
PCT/US14/55958 filed Sep. 16, 2014 International Search Report and Written Opinion, dated May 1, 2015.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.

(56) References Cited

OTHER PUBLICATIONS

Wahid et al., Characterising the Evolution in Scanning Activity of Suspicious Hosts, Oct. 2009, Third International Conference on Network and System Security, pp. 344-350.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

FUZZY HASH OF BEHAVIORAL RESULTS

FIELD

Embodiments of the disclosure relate to the field of network security. More specifically, one embodiment of the disclosure relates to a system, apparatus, and method for classifying a suspect object in a malware system using a fuzzy hash of behaviors of the suspect object and clusters of previously classified objects.

GENERAL BACKGROUND

Over the last decade, malicious software (malware) has become a pervasive problem for Internet users. In some situations, malware is a program, file, or digital data object that is embedded within downloadable content and designed to adversely influence (i.e., attack) normal operations of a computer. Examples of different types of malware may include bots, computer viruses, worms, Trojan horses, spyware, adware, or any other programming that operates within the computer without permission.

For instance, content may be embedded with objects associated with a web page hosted by a malicious web site. By downloading this content, malware causing another web page to be requested from a malicious web site may be unknowingly installed on the computer. Similarly, malware may also be installed on a computer upon receipt or opening of an electronic mail (email) message. For example, an email message may contain an attachment, such as a Portable Document Format (PDF) document, with embedded executable malware. Also, malware may exist in files infected through any of a variety of attack vectors, which are uploaded from the infected computer onto a networked storage device such as a file share.

As development of malware has progressed, hackers have developed malware that share similarities with other malware objects, but maintain some dissimilarities. Accordingly, these "similar" malware objects may be in the same malware family, but traditional malware and anti-virus protection systems may fail to properly classify each object in the family as malware based on these differences. For example, traditional malware detection and classification techniques may employ a direct comparison of a suspect object with known malware objects in an attempt to reveal an exact match. However, if the suspected malware object has not been previously detected and analyzed (e.g., zero-day malware threats), these direct comparison techniques will fail to classify the object as malware even if "similar" objects have been previously classified as malware. Accordingly, traditional malware classification and analysis techniques may prove inaccurate and inefficient as these techniques do not accommodate for small difference between malware objects within a family of malware.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1:
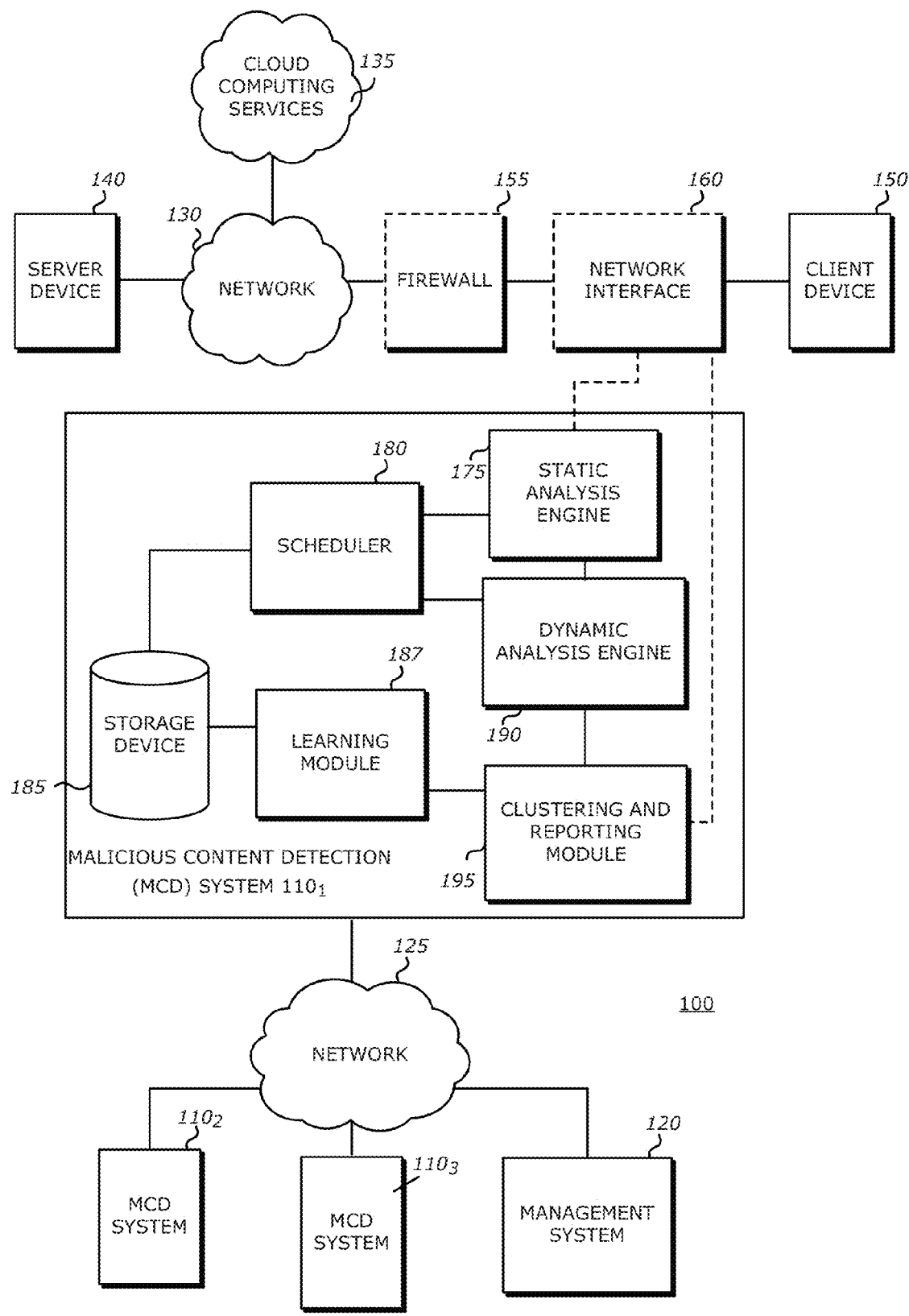
FIG. 1 is an exemplary block diagram of a communication system deploying a plurality of malicious content detection (MCD) systems according to one embodiment of the invention.

In one embodiment of the invention, a communication system is provided that includes a plurality of malicious content detection (MCD) systems communicatively coupled to a management system via a network. Each of the MCD systems may detonate, execute, open, or otherwise process a suspected malware object such that the suspect object conducts/performs a set of behaviors. These behaviors are collected and recorded such that further analysis with objects previously analyzed and assigned to clusters may be performed. In one embodiment, the recorded behavior data for the suspect object may be used to generate a fuzzy hash. A fuzzy hash allows the comparison of objects to determine similarity of the objects instead of necessarily a direct match. In comparison, traditional hashing techniques only allow a comparison of objects to determine an exact match. By allowing the determination of "similar" objects, fuzzy hashes afford a greater leniency in classification and categorization of objects that might be slightly different but otherwise share important characteristics.

As alluded to above, the fuzzy hash of the suspect object is compared against fuzzy hashes of one or more objects in one or more clusters. In one embodiment, machine learning may be utilized to determine a "similar" object in a cluster. Upon detection of a "similar" object, the suspect object may be associated with the cluster and classified based on information attached to the cluster. For example, the suspect object may be classified as malware, non-malware, or with an unknown status based on the classification of objects within the cluster. In some embodiments, the suspect object may be assigned a malware family name associated with the cluster.

As described above, fuzzy hash techniques may be used to group "similar" objects in clusters for further analysis and classification. This similarity matching provides 1) greater flexibility in analyzing potential malware objects, which may share multiple characteristics and behaviors but are also slightly different from previously classified objects, 2) a more efficient technique for classifying/assigning attributes to objects (e.g., malware family names), and 3) increase accuracy in identifying malware.

II. Terminology

In the following description, certain terminology is used to describe features of the invention. For example, in certain situations, the terms "logic" and "engine" are representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information transmitted over a network as one or more messages, namely a grouping of information that comprises a header and a payload, such as any of the following: a packet; a frame; a stream being a sequence of packets or frames; an Asynchronous Transfer Mode "ATM" cell; or any other series of bits having a prescribed format. An "object" may be construed as a portion of the content, namely information within one or more of the messages. The "payload" is generally defined as including the data associated with the message such as text, executable software, an image, audio, video, a Uniform Resource Locator (URL), or other types of digital data. The "header" is generally defined as a part of the message that includes control information. However, the specific types of control information depend on the content/object type.

For network traffic, such as data transmitted in accordance with a Hypertext Transfer Protocol (HTTP), HyperText Markup Language (HTML) protocol, the header may include source and destination Internet Protocol (IP) addresses (e.g., IPv4 or IPv6 addressing) and/or source and destination port information.

Another example of content or objects includes email, which may be transmitted using an email protocol such as Simple Mail Transfer Protocol (SMTP), Post Office Protocol version 3 (POP3), or Internet Message Access Protocol (IMAP4). A further example of content or objects includes an Instant Message, which may be transmitted using Session Initiation Protocol (SIP) or Extensible Messaging and Presence Protocol (XMPP) for example. Yet another example of content or objects includes one or more files that are transferred using a data transfer protocol such as File Transfer Protocol (FTP) for subsequent storage on a file share. Where the content or object is email, Instant Message or a file, the header may include the sender/recipient address, the sender/recipient phone number, or a targeted network location of the file, respectively.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that application software in a malicious manner; (2) alters the functionality of an electronic device executing that application software without any malicious intent; and/or (3) provides an unwanted functionality which is generally acceptable in other context.

The term "transmission medium" is a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause one or more clusters of objects, each of which comprise information representative of prior detected and classified objects, to be shared among some or all of the MCD systems $110_1$-$110_N$ for use in malware checks. Such sharing may be conducted automatically or manually uploaded by an administrator. Also, such sharing may be conducted freely among the MCD systems $110_1$-$110_N$ or subject to a subscription basis.

Herein, according to the embodiment illustrated in FIG. 1, a first MCD system $110_1$ is an electronic device that is adapted to analyze information associated with network traffic routed over a communication network 130 between at least one server device 140 and at least one client device 150.

The communication network 130 may include a public computer network such as the Internet, in which case an optional firewall 155 (represented by dashed lines) may be interposed between communication network 130 and the client device 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (referred to as a "tap" or "network tap") that is configured to receive network traffic propagating to/from the client device 150 and provide content from the network traffic to the first MCD system $110_1$.

In general, the network interface 160 receives and duplicates the content that is received from and provided to client device 150 normally without an appreciable decline in performance by the server device 140, the client device 150, or the communication network 130. The network interface 160 may duplicate any portion of the content, for example, one or more files or objects that are part of a data flow or part of the payload contained within certain data packets, or the like.

In some embodiments, the network interface 160 may capture metadata from network traffic intended for the client device 150. This metadata may be used, at least in part, to deconstruct a corresponding file. For instance, the metadata may include keys that can be used to de-obfuscate a file or object.

It is contemplated that, for any embodiments where the first MCD system $110_1$ is implemented as an dedicated appliance or a dedicated computer system, the network interface 160 may include an assembly integrated into the appliance or computer system that includes network ports, a network interface card and related logic (not shown) for connecting to the communication network 130 to non-disruptively "tap" network traffic propagating through firewall 155 and provide a copy of the network traffic to the dynamic analysis engine 190. In other embodiments, the network interface 160 can be integrated into an intermediary device in the communication path (e.g., firewall 155, router, switch or other network device) or can be a standalone component, such as an appropriate commercially available network tap. In virtual environments, a virtual tap (vTAP) can be used to duplicate files from virtual networks.

Referring still to FIG. 1, first MCD system $110_1$ may include a scheduler 180, a storage device 185, a dynamic analysis engine 190, and a clustering and reporting module 195. In some embodiments, the network interface 160 may be contained within the first MCD system $110_1$. Also, the dynamic analysis engine 190 and the clustering and reporting module 195 may be software modules executed by a processor that receives content and performs a dynamic scan analysis on objects within the content, which may involve accessing one or more non-transitory storage mediums operating as the storage device 185. In some embodiments, the dynamic analysis engine 190 may be one or more software modules, where such software modules are executed by a processor within the MCD system $110_1$. The clustering and reporting module 195 may be one or more software modules executed by the same or a different processor, where these different processors are possibly located at geographically remote locations, located within the same processor package (e.g. different processor cores) and/or communicatively coupled for example via a network.

Herein, in one embodiment, the static analysis engine 175 may serve as a filter to permit subsequent malware analysis of one or more objects that may represent only on a portion of incoming content, which effectively conserves system resources and provides faster response time in determining the presence of malware within the analyzed content. As shown in FIG. 1, the static analysis engine 175 receives the copy of incoming content from the network interface 160 and applies heuristics to determine if any object(s) of the content are "suspicious". The heuristics applied by the static analysis engine 175 may be based on data and/or rules stored in a database (not shown). Also, the static analysis engine 175 may examine the image of the captured content without executing or opening the captured content.

For example, the static analysis engine 175 may examine objects such as metadata or certain attributes of the captured content to determine whether a certain portion of the captured object matches (e.g., a high level of correlation with) a predetermined pattern of attributes that is associated with a malicious attack. According to one embodiment of the disclosure, the static analysis engine 175 flags objects from one or more data flows as suspicious after applying this heuristic analysis.

Thereafter, according to one embodiment of the invention, the static analysis engine 175 may be adapted to transmit at least an object of the suspicious content to the dynamic analysis engine 190. The portion of the object(s), such as some metadata for example, may identify attributes of the runtime environment in which the suspicious content should be processed and, on occasion, of the client device(s) 150 to which the suspicious content was being sent. Such metadata or attributes are used to identify a configuration of a virtual machine (VM) needed for subsequent malware analysis. In another embodiment of the disclosure, the dynamic analysis engine 190 may be adapted to receive one or more messages (e.g., data packets) from the static analysis engine 175 and analyze the message(s) to identify the software profile information associated with the needed VM.

For instance, as an illustrative example, the suspicious object(s) under test may include a portion of an email message that was generated, under control of Windows® 7 Operating System, using a Windows® Outlook 2010, version 1. Upon determining that the object includes suspicious content, such as an attachment for example, static analysis engine 175 provides software profile information to scheduler 180 to identify a particular configuration of VM needed to conduct dynamic analysis of the suspicious object. According to this illustrative example, the software profile information would include (1) Windows® 7 Operating System (OS); (2) Windows® Outlook 2010, version 1; and perhaps (3) an Adobe® reader if the attachment is a Portable Document Format (PDF) document.

The static analysis engine 175 supplies the software profile information to the scheduler 180, which determines whether any of the VM disk files within storage device 185 feature a software profile supporting the above-identified configuration of OS and one or more applications or a suitable alternative.

The dynamic analysis engine 190 is adapted to execute multiple VMs, to simulate the receipt and processing of different types of "suspicious" objects as well as different operating environments. Furthermore, the dynamic analysis engine 190 monitors and analyzes the activities and other behaviors of such objects during processing in the VM. The behaviors may include those expected and/or not expected during processing of that type of object. Unexpected behaviors can be considered anomalous behaviors. Examples of anomalous behaviors may include unusual network transmissions, opening certain ports to retrieve data, unusual changes in performance, and the like. This detection process is referred to as a dynamic malicious content detection.

The dynamic analysis engine 190 may flag the suspicious object as malware according to the observed behavior of the VM. In response to detecting anomalous behaviors, the dynamic analysis engine 190 may provide information to the cluster and reporting module 195 to conduct further analysis with objects previously analyzed and assigned to clusters, as described below.

Figure 2:
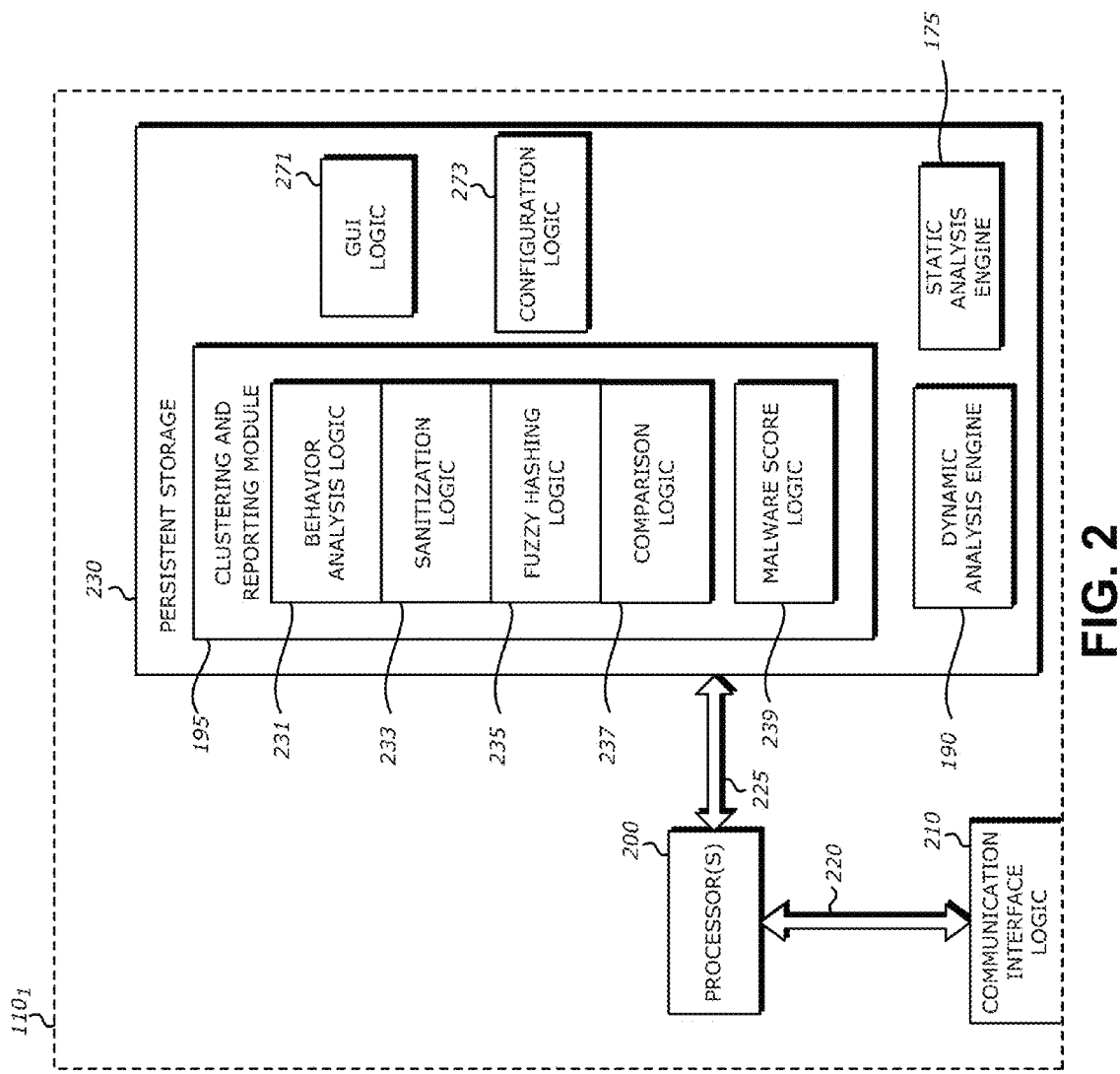
FIG. 2 is an exemplary block diagram of a MCD system according to one embodiment of the invention.

Referring now to FIG. 2, an exemplary block diagram of logic associated with MCD system $110_1$ is shown. MCD system $110_1$ comprises one or more processors 200 that are coupled to communication interface logic 210 via a first transmission medium 220. Communication interface logic 210 enables communications with other MCD systems $110_2$-$110_N$, management system 120 and/or cloud computing services 135 of FIG. 1. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

Processor(s) 200 is(are) further coupled to persistent storage 230 via transmission medium 225. According to one embodiment of the disclosure, persistent storage 230 may include static analysis engine 175, dynamic analysis engine 190, graphical user interface (GUI) logic 271, configuration logic 273, and clustering and reporting module 195, which comprises behavior analysis logic 231, sanitization logic 233, fuzzy hashing logic 235, comparison logic 237, and malware score logic 239. Of course, when implemented as hardware, engine 190 and logic 231, 233, 235, 237, 239, 271, and 273 would be implemented separately from persistent storage 230.

Figure 3:
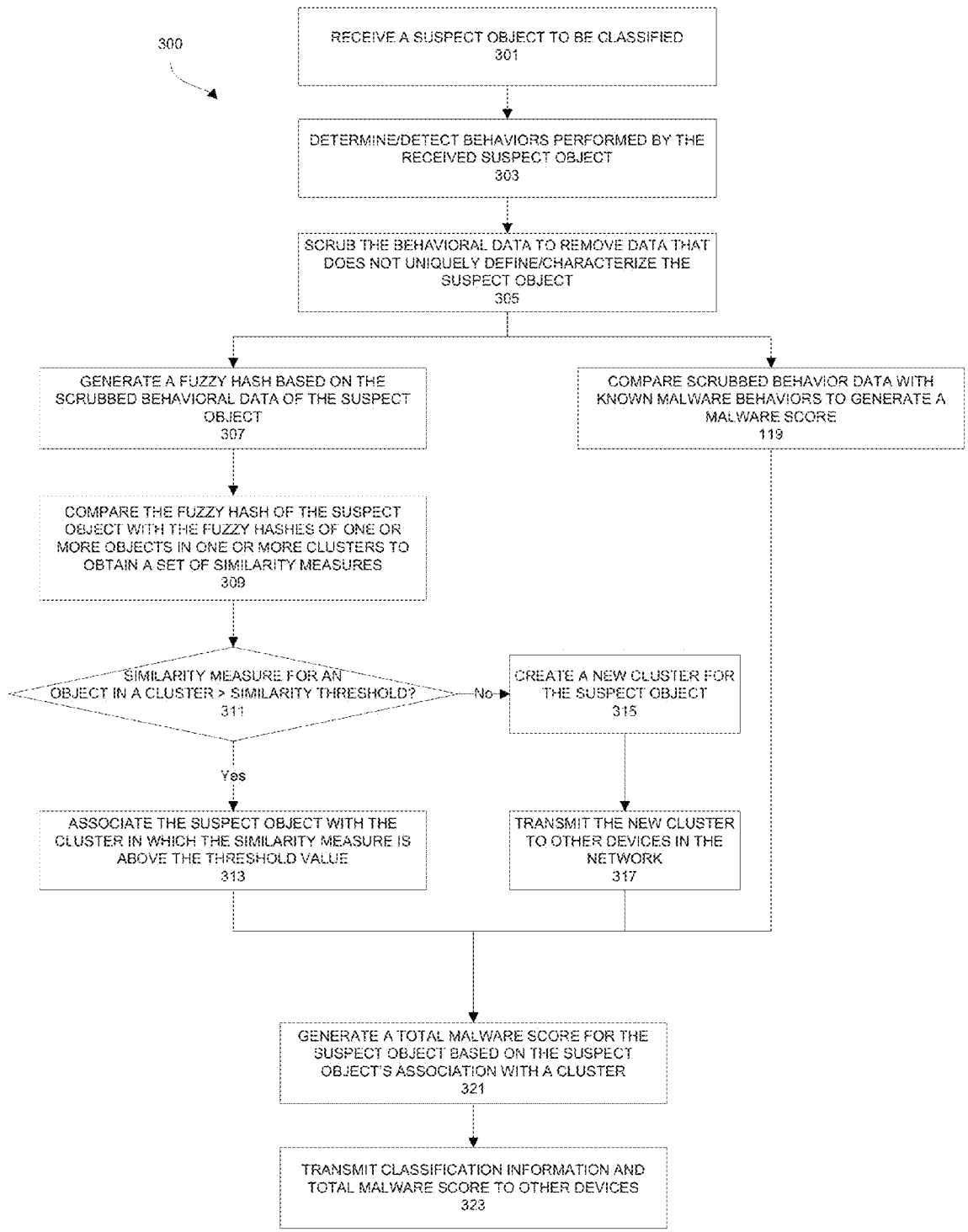
FIG. 3 is a diagram of a method for classifying objects using fuzzy hashes of previously classified objects according to one embodiment of the invention.

Turning now to FIG. 3, a method for classifying objects 300 will now be described. Each operation of the method 300 may be performed by one or more components of the MCD system $110_1$. For example, the operation of method 300 may be performed by the dynamic analysis engine 190 in conjunction with the clustering and reporting module 195 of the MCD system $110_1$. In other embodiments, the operations of method 300 may be performed in full or in part by other components of the communication system 100.

The method 300 may commence at operation 301 with receipt of a suspect object to be classified. The suspect object may be intercepted by the network interface 160 and passed to the MCD system $110_1$ for analysis. In another embodiment, an anti-malware system running on the client device 150 may periodically and without direct provocation by the user intercept and transmit objects to the MCD system $110_1$ for processing and analysis. This independent interception and analysis of objects allows the client device 150 to maintain an automatic examination of potential malware objects received without direct interaction by a user.

In another embodiment, a user of the client device 150 may submit a suspect object through a user interface. The interface may be generated by GUI logic 271 and served to the client device 150 by configuration logic 273 of the MCD system $110_1$. In this fashion, the MCD system $110_1$ may operate as a web-server to deliver data and a user interface to the client device 150.

Figure 4A:
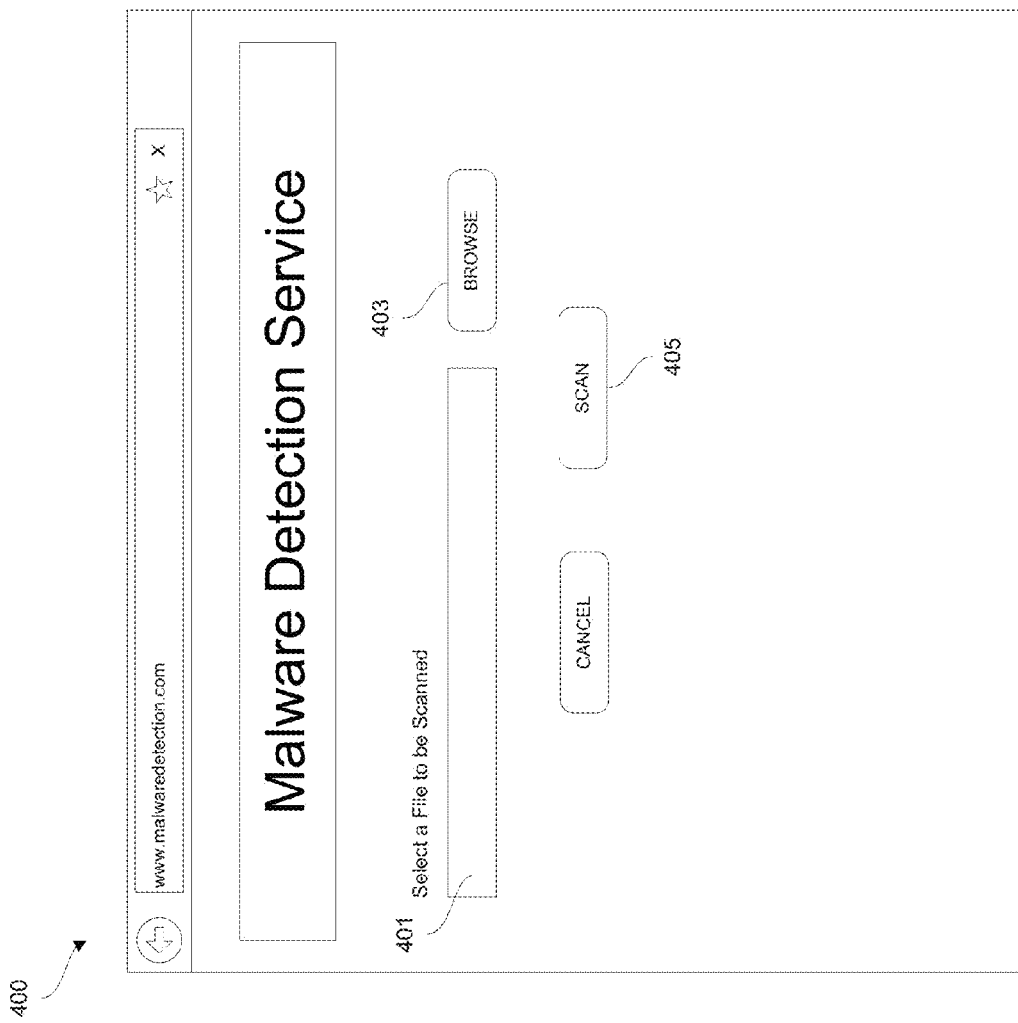
FIG. 4A shows an example user interface for entering information for a suspect object according to one embodiment of the invention.

FIG. 4A shows a web-interface 400 for submitting a suspect object to the MCD system $110_1$ for analysis according to one embodiment. In this example interface 400, a user may direct a web browser running on the client device 150 to view the web-interface 400. The user may thereafter enter the address/location of a suspect object into the web-interface 400 using the address input field 401 and the "BROWSE" button 403. The entered address indicates the location of the suspect object in storage on the client device 150 or on a remote device (e.g., stored on a website). After selection of a suspect object, the user may submit the suspect object for analysis by selecting the "SCAN" button 405 in the web-interface 400. The suspect object may be transmitted from the client device 150 such that it is received by the MCD $110_1$ for processing as described above at operation 301.

In one embodiment, a suspect object may be any digital data structure. For example, a suspect object may be a file (e.g., PDF document), a component of a file, a component of a web page, an image, a series of captured network/web traffic that is capable of being replayed, etc. As described above, a user of the client device 150 may manually determine that an object is suspected to be malware or the client device 150 may automatically classify the object as potential/suspected malware and transmit the suspect object to the MCD system $110_1$.

Referring back to FIG. 3, although described in relation to receiving a single suspect object, in other embodiments, the method 300 may be used in relation to multiple suspect objects received simultaneously or in rapid succession. For example, the method 300 may be used to analyze multiple suspect objects received from the client device 150 or other devices on the network 130. The suspect objects may be processed by the method 300 separately to determine whether each received suspect object is malware based on comparisons with previously generated clusters of objects using fuzzy hashes as described in greater detail below.

Following receipt of a suspect object, operation 303 determines behaviors of the suspect object using the behavior analysis logic 231. The determined behaviors characterize the suspect object such that a comparison can be performed with other previously classified objects in one or more object clusters as will be described in further detail below.

In one embodiment, the behaviors may be determined/detected at operation 303 after the suspect object has been detonated, namely processed (e.g. executed, opened or otherwise activated), by the dynamic analysis engine 190. For example, dynamic analysis engine 190 may detonate the suspect object such that operations associated with the suspect object are performed. For instance, in one embodiment the suspect object may be a PDF file. In this embodiment, the dynamic analysis engine 190 may detonate the PDF file by opening the file using an Adobe® Reader or other appropriate document reader.

In one embodiment, one or more virtual machines with various profiles that simulate the client device 150 may be used during detonation of the suspect object. These profiles may be software to be run by a virtual machine to process a suspect object. For example, the profiles may include an operating system and one or more suitable computer applications that are associated with the client device 150. For instance, an Adobe® Reader may be included in a virtual machine such that a suspect object, which is a PDF file, may be detonated by the virtual machine. Use of virtual machines ensures that detonation of the suspect object is controlled and will not result in infection of the client device 150 while still simulating the computing environment of the client device 150 to generate behavior data that describes the suspect object.

As noted above, detonation of the suspect object produces behavior data that describes the suspect object such that a comparison may later be performed with other objects. This behavior data may be detected and collected at operation 303 using the behavior analysis logic 231. The behavior data may include, for example, details regarding data generated by the suspect object during detonation, data accessed by the suspect object (both locally and from remote systems) during detonation, known exploits in the suspect object, etc.

In one embodiment, operation 305 may scrub the behavior data detected and collected at operation 303 to remove data that does not identify the suspect object. This scrubbing operation may be performed using the sanitization logic 233.

In one embodiment, scrubbing the behavior data includes removing a subset of process identifiers of processes called by the suspect object during detonation, values written to, deleted from, or modified to a registry by the suspect object during detonation such that only the path of these operations is retained, and names of files generated, modified, and/or deleted by the suspect object during detonation such that only a path in an associated file system is retained. This removed/scrubbed data may be discarded at operation 305 as it does not identify the suspect object in relation to other objects and may be considered superfluous.

After the behavior data has been scrubbed at operation 305 to generate scrubbed behavior data, the method 300 may perform two analyses: 1) an analysis to associate the suspect object with a cluster of previously stored/analyzed objects and 2) an analysis to generate a malware score, which describes the probability that the suspect object is malware. The analyses may be run concurrently or asynchronously. In one embodiment, the results of the first analysis (i.e., cluster association) may be used to modify the malware score generated by the second analysis. Each of these analyses will be described in greater detail below.

Beginning with the first analysis of the suspect object, at operation 307 a fuzzy hash for the suspect object may be generated based on the scrubbed behavior data using the fuzzy hashing logic 235. A fuzzy hash allows the comparison of objects to determine similarity of the objects instead of necessarily a direct match. In comparison, traditional hashing techniques only allow a comparison of objects to determine an exact match. By allowing the determination of "similar" objects, fuzzy hashes afford a greater leniency in classification and categorization of objects that might be slightly different but otherwise share important characteristics. Through the utilization of a fuzzy hash, similar objects may be determined through a comparison of hash values within the fuzzy hash as will be described in greater detail below.

In one embodiment, a fuzzy hash is constructed by running a hashing algorithm over blocks of the scrubbed behavior data for an object. In one embodiment, an MD5 hash may be performed on successive blocks of scrubbed behavior data to produce a plurality or a stream of hash values. For example, the scrubbed behavior data may be separated into N equal sized blocks, where N is greater than or equal to two (e.g., 1024 byte blocks). A hash value is produced for each of the N blocks to generate exactly N hash values. In one embodiment, the scrubbed behavior data may be separated into blocks corresponding to segments of data that represent discrete behaviors detected at operation 303. Accordingly, in this embodiment, each block represents a single detected behavior associated with the suspect object.

Although described in relation to use of an MD5 hash for generation of the fuzzy hash, in other embodiments other hashing techniques/methods may be used. For example, in other embodiments a SHA, SWIFFT, and/or HAVAL hash may be used to generate the fuzzy hash for the suspect object at operation 307.

Following the generation of a fuzzy hash for the suspect object at operation 307, operation 309 may compare the fuzzy hash for the suspect object with one or more fuzzy hashes of other previously stored/classified objects associated with clusters. This comparison may be performed using the comparison logic 237 of the MCD system $110_1$. In one embodiment, the previously stored clusters of objects are stored locally on the MCD system $110_1$ in the storage device 185 or a separate data store (e.g. part of persistent storage 230 of FIG. 2). In other embodiments, the previously stored clusters of objects may be stored in cloud computing services 135 or the management system 120. In these embodiments, the management system 120 may distribute clusters of objects to MCD systems $110_1$-$110_3$ as needed or the MCD systems $110_1$-$110_3$ may directly access the clusters of objects over the network 125 for analysis of other objects received by these MCD systems $110_1$-$110_3$.

Figure 5:
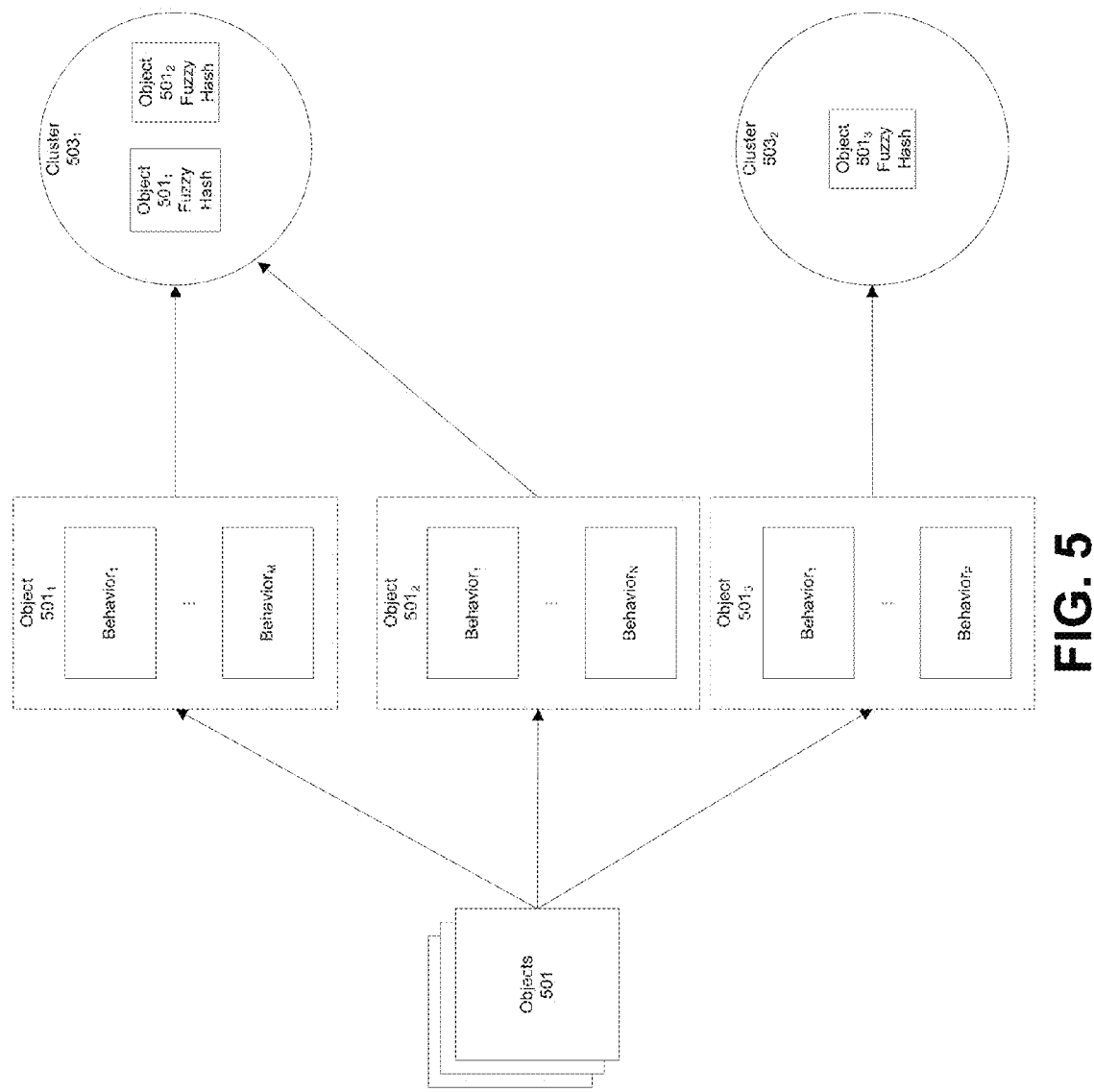
FIG. 5 is a diagram of a set of objects assigned to a set of clusters according to one embodiment of the invention.

As shown in FIG. 5, each previously stored object 501 may be associated with one or more behaviors. Similar to the behaviors of the suspect object, the behaviors of the previously stored objects 501 characterize the dynamic actions, operations, and activities of the objects 501 during detonation. A fuzzy hash may be associated with each object 501 based on these behaviors in a similar fashion as described above in relation to operation 307. Each of the previously stored objects 501 may be associated with a cluster 503 based on a similarity of fuzzy hashes for each respective object 501. For example, as shown in FIG. 5, objects $501_1$ and $501_2$ are associated with the cluster $503_1$. This association indicates that the fuzzy hashes of objects $501_1$ and $501_2$ are "similar" and may be considered in the same family. In one embodiment, similarity may be described in terms of the number of matching hash values between the respective fuzzy hashes of objects $501_1$ and $501_2$. For example, the fuzzy hashes of two objects may be compared to determine a similarity measure. The similarity measure may describe the percentage or number of matching hash values between the two fuzzy hashes. In one embodiment, a similarity measure above a predefined similarity threshold indicates that the objects are similar. Since the objects $501_1$ and $501_2$ are in the same cluster $503_1$, the comparison of fuzzy hashes for objects $501_1$ and $501_2$ would yield a similarity measure above the predefined similarity threshold. In contrast, the comparison of fuzzy hashes for objects $501_1$ and $501_3$ would yield a similarity measure below the predefined similarity threshold since these objects $501_1$ and $501_3$ are associated with different clusters (e.g., clusters $503_1$ and $503_2$ respectively).

Figure 6:
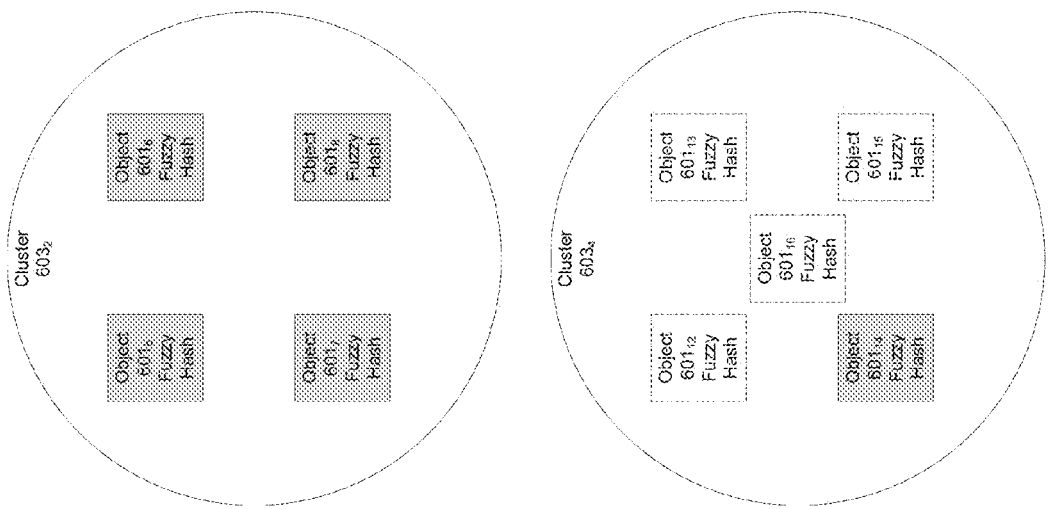
FIG. 6 is a diagram of a set of objects known as malware, known as non-malware, or with an unknown status and assigned to a set of clusters according to one embodiment of the invention.
Figure 6:
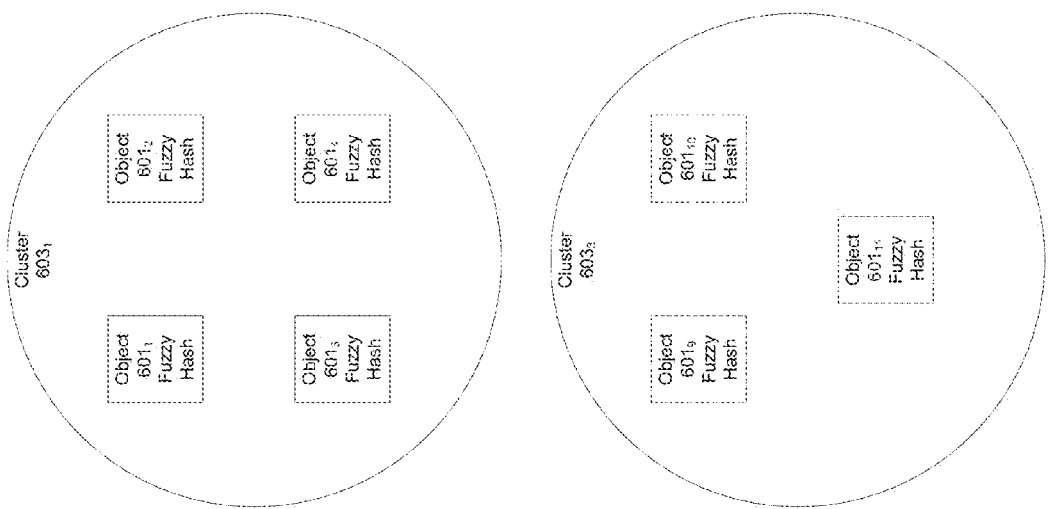

Referring back to FIG. 3 and returning to operation 309, the fuzzy hash of the suspect object is compared with one or more fuzzy hashes of previously stored objects associated with clusters. Using the example set of objects 601 in FIG. 6, the fuzzy hash of the suspect object may be compared against the fuzzy hashes of one or more of the objects $601_1$-$601_{15}$. In one embodiment, operation 309 compares the fuzzy hash of the suspect object with the fuzzy hash of at least one object 601 in each cluster 603. Each comparison yields a separate similarity measure that describes the similarity of the suspect object and each respective comparison object 601.

In one embodiment, operation 309 may utilize statistical and machine learning to determine whether the suspect object is similar to an object in a cluster. Machine learning refers to a process or system that can learn from data, i.e., be trained to distinguish between "good" and "bad", or in this case, between similar objects and non-similar objects. The core of machine learning deals with representation and generalization, that is, representation of data objects (e.g., the anomalies and other analytical results, which can be collectively represented by features/behaviors of the objects), and functions performed on those objects (e.g., weighting and probability formulas). Generalization is the property that the process or system uses to apply what it learns on a learning set of known (or "labeled") data objects to unknown (or "unlabeled") examples. To do this, the process or system must extract learning from the labeled set that allows it to make useful predictions in new and unlabeled cases.

For machine learning, the MCD system $110_1$ may operate in a training mode and in an operational mode. In a training mode, the MCD system $110_1$ employs threat heuristics training logic to subject known samples (e.g., labeled samples) of similar objects and known samples of non-similar objects to calibrate threat heuristics logic for probability scoring and/or decision making of objects. To accomplish this, the threat heuristics training logic may submit similar and non-similar objects to analyzers. In some embodiments, the threat heuristics training logic may employ a special forensics system. In alternative embodiments, the threat heuristics training logic may test the similar and non-similar objects each time it processes a different suspect object, or it may store the results of prior tests for use for future processing of objects. The threat heuristics training logic may assign a probability score (e.g., a similarity measure) to each of the possible patterns resulting from testing the similar and non-similar objects. These probability scores and classification labels are indicative of whether a set of objects are similar. In one embodiment, the machine learning routines and operations described above may be performed by the learning module 187 shown in FIG. 1 based on inputs from the storage device 185 and/or the clustering and reporting module 195.

Referring back again to FIGS. 2-3, at operation 311, the set of similarity measures generated at operation 309 may be compared against the predefined similarity threshold to determine whether the suspect object is "similar" to a previously stored object in a preexisting cluster. This comparison may be performed by the comparison logic 237 and reveals whether the suspect object is within the same family as objects within a cluster. As noted above, if a similarity measure is above the predefined similarity threshold, the suspect object is "similar" to the corresponding object. However, if the similarity measure is below the predefined similarity threshold, the suspect object is not "similar" to the corresponding object. In one embodiment, the predefined similarity threshold may be set by an analyst, network administrator, and/or subscriber.

Figure 7A:
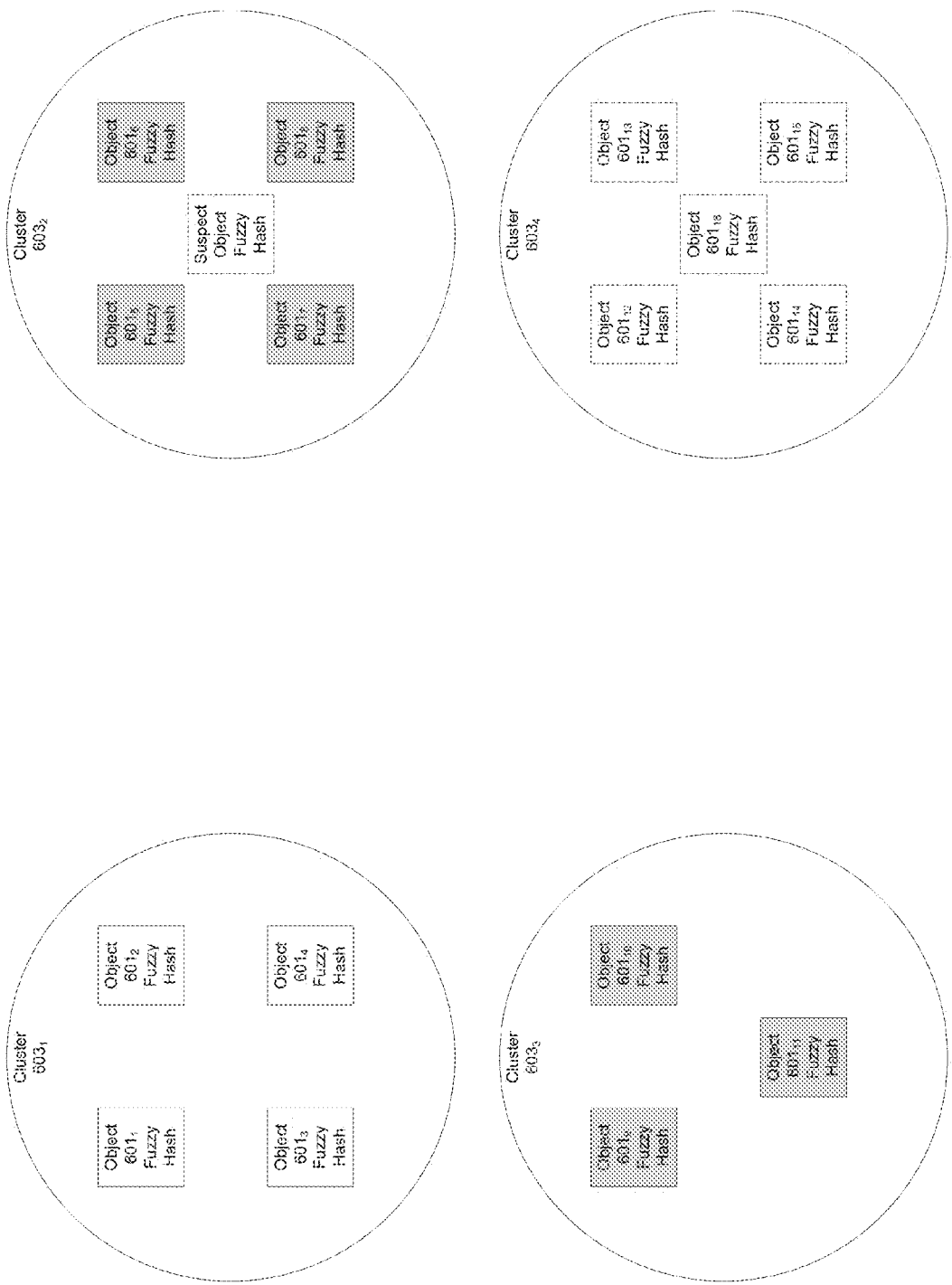
FIG. 7A is a diagram of a suspect object being added to a preexisting cluster according to one embodiment of the invention.

Upon determining that a similarity measure is above the predefined similarity threshold, the method moves to operation 313. At operation 313, the suspect object is associated with the cluster of the object with which the generated similarity measure exceeded the predefined similarity threshold. For example, as shown in FIG. 7A, the fuzzy hash of the suspect object may be added to cluster $603_2$. In this example, the similarity measure between the suspect object and one or more of the objects $601_5$-$601_8$ is above the predefined similarity threshold.

In one embodiment, association with a cluster may be used to further describe the suspect object. For example, association with a cluster may be used to 1) determine a malware family name for the suspect object and/or 2) determine whether the suspect object is malware, non-malware, or has an unknown status.

As shown in FIG. 7A, the objects $601_1$-$601_4$ in the cluster $603_1$ were determined to be non-malware (indicated by the lack of shading for these objects $601_1$-$601_4$). This classification determination may be based on a previous dynamic or static analysis of the objects $601_1$-$601_4$. In this case, if the suspect object had been associated with the cluster $603_1$, the suspect object would be classified as non-malware.

In comparison, the objects $601_5$-$601_8$ in the cluster $603_2$ were determined to be malware (indicated by shading of these objects $601_5$-$601_8$) and associated with the malware family name "MalBot". Again, this classification determination may be based on a previous dynamic or static analysis of the objects $601_5$-$601_8$ using both comparisons with locally stored objects and objects stored remotely. Since the suspect object has been associated with the cluster $603_2$ in the example provided above, the suspect object is classified malware and associated with the malware family name "MalBot".

In some instances, a status of a set of objects in a cluster may not yet be known. For example, in the cluster $603_4$ shown in FIG. 7A the status of these objects $601_{12}$-$601_{16}$ cannot yet be determined as malware or non-malware (indicated by dashed border for these objects $601_{12}$-$601_{16}$). Accordingly, if the suspect object had been associated with the cluster $603_4$, the suspect object would be classified with an unknown status. Grouping objects with unknown status may later be useful when a classification and/or malware family name may be assigned to these objects.

In some embodiments, association of an object with a cluster may only be informative and not provide classification information. For example, the cluster $603_3$ may include several objects $601_9$-$601_{11}$ that have been classified as malware and associated with the malware family name "DataStealer". However, association with cluster $603_3$ may only yield an association with a malware family name associated with the cluster $603_3$ (e.g., "DataStealer") instead of also a classification for the newly added object. This failure to yield classification information for new objects may be based on a number of false positive malware classifications associated with the cluster $603_3$ or another threshold that indicates an unreliable classification.

In one embodiment, operations 309 and 311 may be first performed in relation to clusters of objects stored locally on the MCD system $110_1$ (i.e., in the storage device 185). Following a failure to locate a locally stored cluster with a "similar" object to the suspect object, the operations 309 and 311 may be performed for clusters of objects stored on other devices. For example, the operations 309 and 311 may be performed on clusters of objects stored on a cloud server located in the cloud computing services 135 in response to a failure to locate a local cluster with a "similar" object.

Figure 7B:
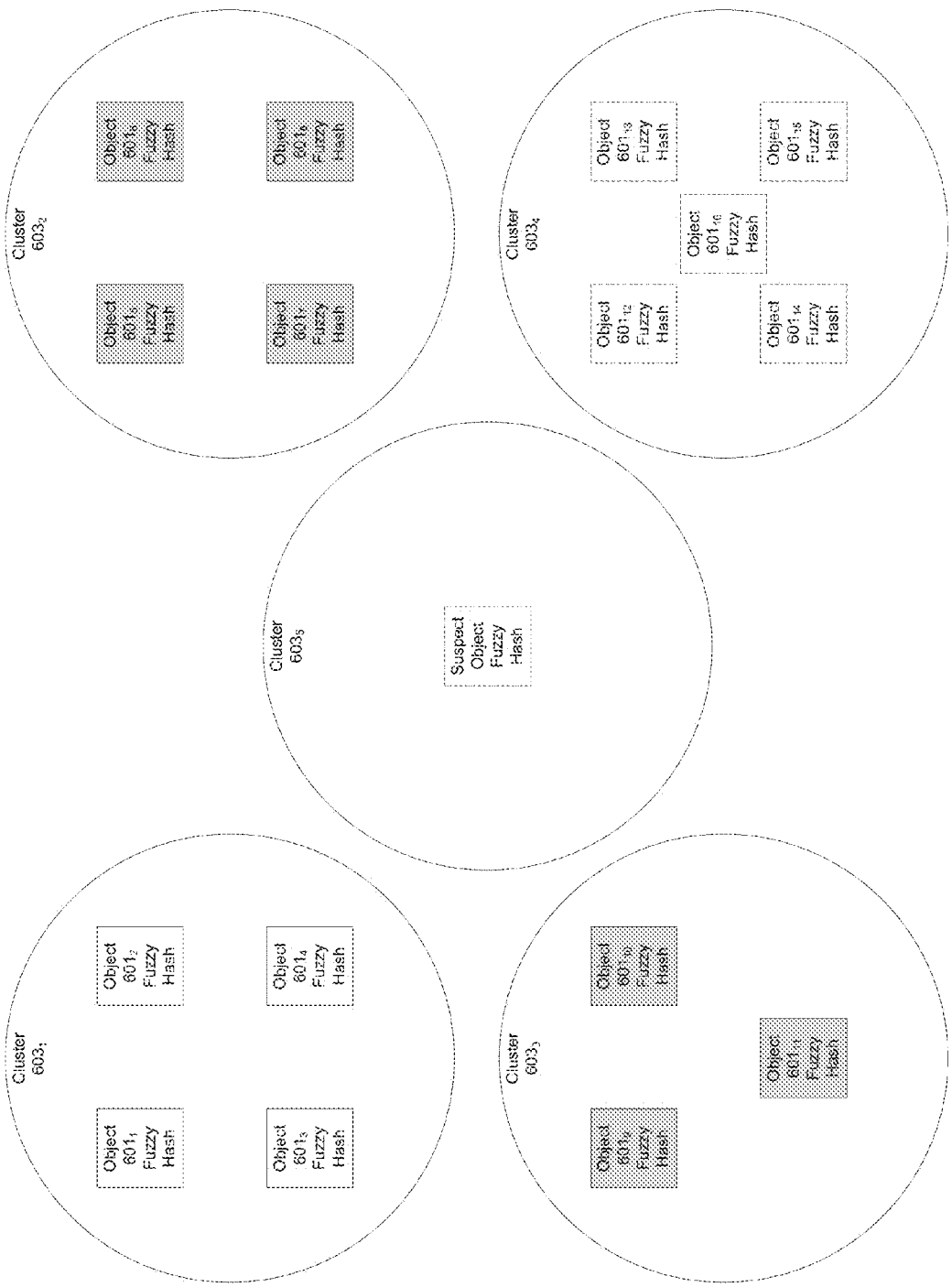
FIG. 7B is a diagram of a suspect object being added to a new cluster according to one embodiment of the invention.

Returning to operation 311 of FIG. 3, upon determining that similarity measures generated for the suspect object at operation 309 are not above the predefined similarity threshold for any local or remote clusters of objects, the method 300 moves to operation 315 to create a new cluster for the suspect object. For example, FIG. 7B, shows the suspect object added to new cluster $603_5$. In this example, the suspect object is not similar to any of the objects $601_1$-$601_{16}$ based on compared fuzzy hashes and accordingly is not part of these families of objects. Instead, the suspect object is the first member of a new family defined by the cluster $603_5$.

Following generation of a new cluster for the suspect object at operation 315, operation 317 may transmit the new cluster to the MCD systems $110_2$ and $110_3$ and/or the management system 120. In one embodiment, the management system 120 may receive the new cluster from the MCD system $110_1$ and propagate this new cluster to the MCD systems $110_2$ and $110_3$ using the network 125. The MCD systems $110_2$ and $110_3$ may utilize this new cluster for future analysis of other objects intercepted or otherwise received from the client device 150 or other devices on the network 130.

As described above, objects intercepted or otherwise received from the client device 150 may be compared using fuzzy hashes to determine similarity. Upon determination of similarity, the received/suspect object may be associated with a corresponding cluster and inherit attributes of the cluster. These attributes may include 1) classification as malware, non-malware, or an unknown status and/or 2) a malware family name. By utilizing fuzzy hash comparisons with previously stored and classified objects, the method 300 provides an efficient technique for classifying newly received objects based on familial similarities.

In one embodiment, the results of the method 300 may be transmitted from the clustering and reporting module 195 to the dynamic analysis engine 190. In this embodiment, the results of the method 300 may be used to supplement the analysis results produced by the dynamic analysis engine 190 to increase the accuracy in identifying suspicious objects as malware.

As noted above, the method 300 may conduct a separate analysis following operation 305 to generate a preliminary malware score, which describes the probability that the suspect object is malware. For example, the preliminary malware score may fall between 0.0 and 1.0. In one embodiment, operation 319 compares the scrubbed behavior data of the suspect object with known malware behaviors using the malware score logic 239 shown in FIG. 2. These known malware behaviors may be cultivated after dynamic analysis of known malware objects by the MCD $110_1$, another device on the network 125 (e.g., the MCDs $110_2$ and $110_3$ or the management system 120), and/or a remote device (e.g., device located within the cloud computing services). In one embodiment, the known malware behaviors are stored in the storage device 185 and describe unexpected, anomalous, and/or malicious actions that are characteristic of malware. Examples of anomalous behaviors may include unusual network transmissions, opening certain ports to retrieve data, unusual changes in performance, and the like.

The comparison at operation 319 yields a preliminary malware score based on the number of similarities between the scrubbed behavior data and the known malware behavior. For example, when multiple behaviors described in the scrubbed behavior data match behaviors in the known malware behaviors, operation 319 may yield a high preliminary malware score (e.g., 0.9), which indicates a high probability the suspect object is malware. In contrast, when few behaviors described in the scrubbed behavior data match behaviors in the known malware behaviors, operation 319 may yield a low preliminary malware score (e.g., 0.1), which indicates a low probability the suspect object is malware. In one embodiment, this comparison at operation 319 may be performed using machine learning and statistical analysis similar to that described above in relation to operation 309.

In one embodiment, the preliminary malware score may be used at operation 321 to generate a final malware score based on the suspect object's association with a cluster at operations 313 or 315. For example, when the suspect object is associated with a cluster that classifies the suspect object as malware, the preliminary malware score from operation 319 may be increased to generate a final malware score that is greater that the preliminary malware score from operation 319. This increase indicates a higher probability that the suspect object is malware than originally computed at operation 319. Conversely, when the suspect object is associated with a cluster that classifies the suspect object as non-malware or with an unknown status, the preliminary malware score from operation 319 may be decreased to generate the final malware score. This decrease indicates a lower probability that the suspect object is malware than originally computed at operation 319. By generating a final malware score that reflects the probability that a suspect object is malware based on both a comparison with known malware behaviors and clusters of classified objects, operation 321 creates a more robust determination of the likelihood that the suspect object is malware.

Figure 4B:
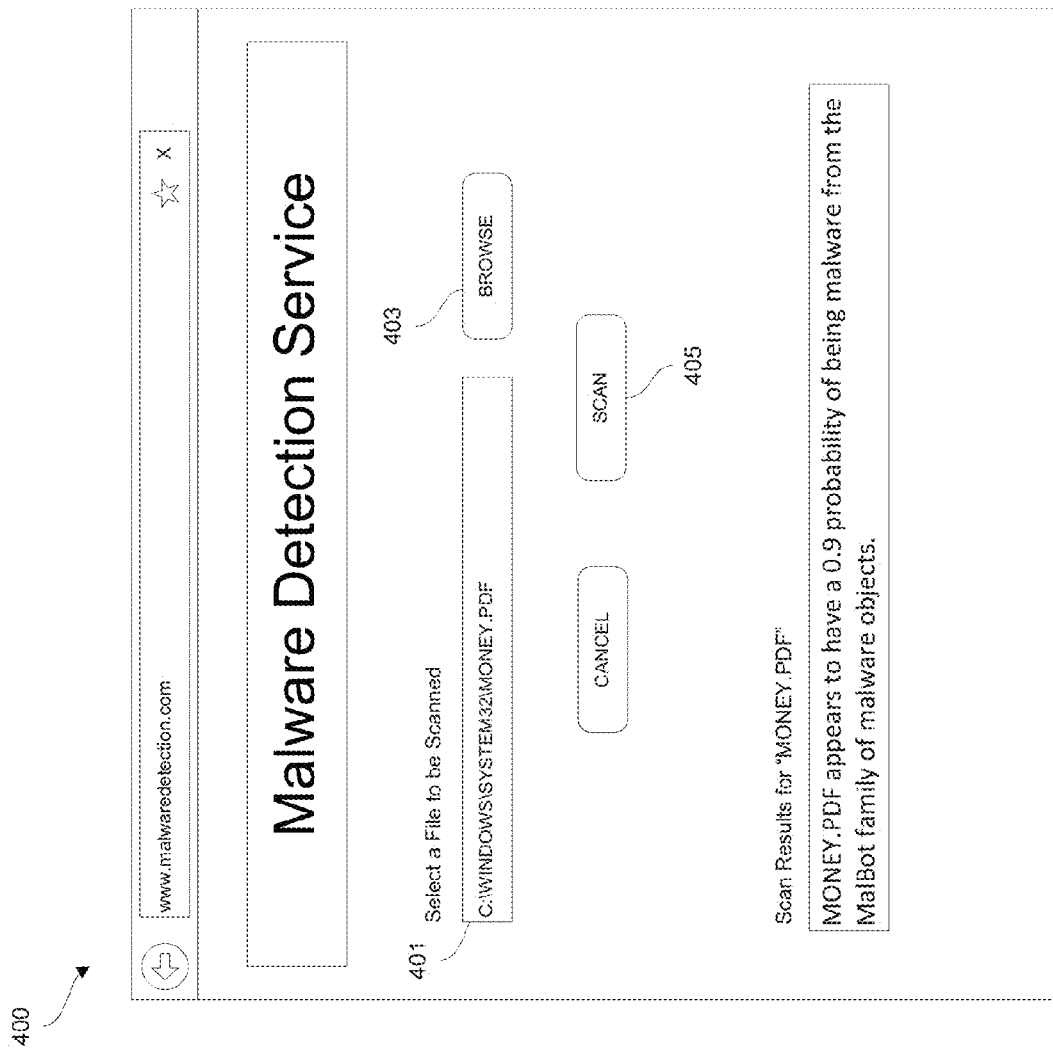
FIG. 4B shows the example user interface of FIG. 4A after a warning message has been returned to a user according to one embodiment of the invention.

At operation 323, the final malware score generated at operation 321 may be transmitted along with the classification and naming information assigned to the suspect object at operations 313 or 315 to a user of the client device, a subscriber of a malware detection service, a network administrator, or another entity. The transmission may be made using an email message, a popup message, or any other message transmission technique. For example, the user interface 400 may be updated to reflect the classification of the suspect object as shown in FIG. 4B.

As described above, the method for classifying objects 300 may utilize fuzzy hash techniques to group "similar" objects in clusters for future analysis. This similarity matching allows greater flexibility in analyzing potential malware objects, which may share multiple characteristics and behaviors but are also slightly different from previously classified objects. These clusters of objects may be continually updated and shared between the MCD systems $110_1$-$110_N$ as new objects are processed by the method 300 such that a robust set of object clusters are maintained for future detection and remediation of families of malware threats.

What is claimed:

1. A computerized method for classifying objects in a malware system, comprising:
   receiving, by a malicious content detection (MCD) system from a client device, an object to be classified;
   detecting behaviors of the received object, wherein the behaviors are detected after processing the received object;
   generating a fuzzy hash for the received object based on the detected behaviors, the generating of the fuzzy hash comprises (i) obtaining a reduced amount of data associated with the detected behaviors by retaining a portion of the data associated with the detected behaviors that corresponds to one or more operations conducted during processing of the received object, and removing metadata associated with the one or more operations conducted during the processing of the received object, the metadata including at least one or more identifiers of processes called during the processing of the received object, and (ii) performing a hash operation on the reduced amount of data associated with the detected behaviors;
   comparing the fuzzy hash for the received object with a fuzzy hash of an object in a preexisting cluster to generate a similarity measure;
   associating the received object with the preexisting cluster in response to determining that the similarity measure is above a predefined threshold value;
   creating a new cluster for the received object in response to determining that the similarity measure is below the predefined threshold value; and
   reporting, by the MCD system, results of either (i) the associating of the received object with the preexisting cluster or (ii) the creating of the new cluster.

2. The computerized method of claim 1, wherein the received object is at least one of a file, a uniform resource locator, a web object, a capture of network traffic for a user over time, and an email message.

3. The computerized method of claim 1, wherein the removed metadata associated with the corresponding operations includes metadata associated with one or more of (1) network calls, (2) modifications to a registry, (3) modifications to a file system, or (4) an application program interface call.

4. The computerized method of claim 1, further comprising:
   generating a preliminary malware score for the received object based on a comparison of the reduced amount of data associated with the detected behaviors with data associated with known malware behaviors, wherein the preliminary malware score indicates the probability the received object is malware; and generating a final malware score for the received object based on the cluster the received object is associated, wherein the final malware score is greater than the preliminary malware score when the received object is associated with a cluster of objects classified as malware and the final malware score is less than the preliminary malware score when the received object is associated with a cluster of objects classified as non-malware.

5. The computerized method of claim 1, wherein the removing of the metadata associated with the one or more operations comprises removing data that does not identify the received object.

6. The computerized method of claim 5, wherein the removing of the metadata further comprises removing at least a portion of values written to a registry by the received object.

7. The computerized method of claim 1, further comprising:
transmitting, by the MCD system, the new cluster or the preexisting cluster with the newly associated received object to another MCD system.

8. The computerized method of claim 1, further comprising:
classifying the received object as malware, non-malware, or with an unknown status to match a classification of the preexisting cluster, when the received object is assigned to the preexisting cluster.

9. The computerized method of claim 1, further comprising:
assigning a malware family name to the received object to match a malware family name of the preexisting cluster, when the received object is assigned to the preexisting cluster.

10. The computerized method of claim 1, wherein the generating of the fuzzy hash further comprises at least one of (a) retaining one or more image paths in an associated file system corresponding to a location of a file that is generated or modified during the processing of the received object or (b) removing a file name prior to performing the hash operation on the data associated with the detected behaviors.

11. The computerized method of claim 1, wherein the generating of the fuzzy hash comprises retaining only the one or more image paths corresponding to operations conducted during processing of the received object as part of the data associated with the detected behaviors.

12. A non-transitory storage medium including instructions that, when executed by one or more hardware processors, performs a plurality of operations, comprising:
detecting behaviors of a received object, wherein the behaviors are detected after processing the received object;
generating a fuzzy hash for the received object based on the detected behaviors, the generating of the fuzzy hash comprises (i) obtaining a reduced amount of data associated with the detected behaviors by retaining a portion of the data associated with the detected behaviors that corresponds to one or more operations conducted during processing of the received object, and removing metadata associated with the one or more operations conducted during the processing of the received object, the metadata including at least one or more identifiers of processes called during the processing of the received object metadata, and (ii) performing a hash operation on the reduced amount of data associated with the detected behaviors;
comparing the fuzzy hash for the received object with a fuzzy hash of an object in a preexisting cluster to generate a similarity measure;
associating the received object with the preexisting cluster in response to determining that the similarity measure is above a predefined threshold value;
creating a new cluster for the received object in response to determining that the similarity measure is below the predefined threshold value; and
reporting results of either (i) the associating of the received object with the preexisting cluster or (ii) the creating of the new cluster.

13. The non-transitory storage medium of claim 12, wherein the received object is one of a file, a uniform resource locator, a web object, a capture of network traffic for a user over time, and an email message.

14. The non-transitory storage medium of claim 12, wherein the removed metadata associated with the one or more operations includes metadata associated with one or more of (1) network calls, (2) modifications to a registry, (3) modifications to a file system, or (4) an application program interface call.

15. The non-transitory storage medium of claim 12 further includes instructions that, when executed by the one or more hardware processors, perform a plurality of operations comprising:
generating a preliminary malware score for the received object based on a comparison of the reduced amount of data associated with the detected behaviors with data associated with known malware behaviors, wherein the preliminary malware score indicates the probability the received object is malware; and
generating a final malware score for the received object based on the cluster the received object is associated, wherein the final malware score is greater than the preliminary malware score when the received object is associated with a cluster of objects classified as malware and the final malware score is less than the preliminary malware score when the received object is associated with a cluster of objects classified as non-malware.

16. The non-transitory storage medium of claim 12, wherein the removing of the metadata associated with the one or more operations comprises removing metadata that does not identify the received object.

17. The non-transitory storage medium of claim 12, wherein the removing of the metadata associated with the one or more operations further comprises removing at least a portion of values written to a registry by the received object.

18. The non-transitory storage medium of claim 12 further includes instructions that, when executed by the one or more hardware processors, perform operations comprising:
classifying the received object as malware, non-malware, or with an unknown status to match a classification of the preexisting cluster, when the received object is assigned to the preexisting cluster.

19. The non-transitory storage medium of claim 12 further includes instructions that, when executed by the one or more hardware processors, perform operations comprising:
assigning a malware family name to the received object to match a malware family name of the preexisting cluster, when the received object is assigned to the preexisting cluster.

20. The non-transitory storage medium of claim 12 including instructions that, when executed by one or more hardware processors, perform an operation of generating of the fuzzy hash that includes one or more operations comprising at least retaining one or more image paths in an associated file system corresponding to a location of a file that is generated or modified during the processing of the received object, or removing the file name prior to performing the hash operation on the data associated with the detected behaviors.

21. The non-transitory storage medium of claim 12 including instructions that, when executed by one or more hardware processors, perform an operation of generating of the fuzzy hash that includes one or more operations comprising retaining one or more image paths corresponding to operations conducted during processing of the received object as part of the data associated with the detected behaviors.

22. A system comprising:
one or more hardware processors;
a memory including one or more software modules that, when executed by the one or more hardware processors:
  detect behaviors of a received object, wherein the behaviors are detected after processing the received object;
  generate a fuzzy hash for the received object based on a portion of the detected behaviors, the generating of the fuzzy hash comprises (i) obtaining a reduced amount of data associated with the detected behaviors by retaining a portion of the data associated with the detected behaviors that corresponds to one or more operations conducted during processing of the received object, and removing metadata associated with the one or more operations conducted during the processing of the received object, the metadata including at least one or more identifiers of processes called during the processing of the received object, and (ii) performing a hash operation on the reduced amount of data associated with the detected behaviors;
  compare the fuzzy hash for the received object with a fuzzy hash of an object in a preexisting cluster to generate a similarity measure;
  associate the received object with the preexisting cluster in response to determining that the similarity measure is above a predefined threshold value;
  create a new cluster for the received object in response to determining that the similarity measure is below the predefined threshold value; and
  report results of either (i) an association of the received object with the preexisting cluster or (ii) a creation of the new cluster.

23. The system of claim 22, wherein the one or more hardware processors, when executing the software modules, further:
classify the received object as malware, non-malware, or with an unknown status to match a classification of the preexisting cluster, when the received object is assigned to the preexisting cluster.

24. The system of claim 22, wherein the one or more hardware processors, when executing the software modules, further:
assign a malware family name to the received object to match a malware family name of the preexisting cluster, when the received object is assigned to the preexisting cluster.

25. The system of claim 22, wherein the memory including the one or more software modules that, when executed by the one or more hardware processors, generate the fuzzy hash for the received object based on the portion of the detected behaviors by retaining one or more image paths in an associated file system corresponding to a location of a file that is generated or modified during the processing of the received object or removing a file name prior to conducting the hash operation on the data associated with the detected behaviors.

26. The system of claim 22, wherein the memory including the one or more software modules that, when executed by the one or more hardware processors, generate the fuzzy hash for the received object based on the portion of the detected behaviors that comprises only the one or more image paths corresponding to operations conducted during processing of the received object.

* * * * *